United States Patent [19]

Mayer et al.

[11] Patent Number: 5,724,855
[45] Date of Patent: Mar. 10, 1998

[54] TRANSMISSION GEAR FOR LINEAR WIPER SYSTEMS

[75] Inventors: Gunter Mayer, Tamm; Wolfgang Scholl, Gemmrigheim, both of Germany

[73] Assignee: ITT Automotive Europe GmbH, Frankfurt, Germany

[21] Appl. No.: 416,697

[22] PCT Filed: Sep. 20, 1993

[86] PCT No.: PCT/EP93/02544

§ 371 Date: Jul. 12, 1995

§ 102(e) Date: Jul. 12, 1995

[87] PCT Pub. No.: WO94/08826

PCT Pub. Date: Apr. 28, 1994

[30] Foreign Application Priority Data

Oct. 10, 1992 [DE] Germany ............. 42 34 201.5

[51] Int. Cl.⁶ ................. F16H 27/02; B60S 1/26
[52] U.S. Cl. ............. 74/89.22; 15/250.29; 475/331
[58] Field of Search ............. 74/89.22; 15/250.29, 15/250.24; 475/331

[56] References Cited

U.S. PATENT DOCUMENTS

| 3,428,996 | 2/1969 | Carpenter | 15/250.29 |
| 3,774,477 | 11/1973 | Murphy | 475/331 |
| 5,373,605 | 12/1994 | Austin | 15/250.29 |

FOREIGN PATENT DOCUMENTS

| 1 015 830 | 10/1952 | France . |
| 1 179 118 | 5/1959 | France . |
| 2919240A1 | 4/1980 | Germany . |
| 29 19 240 | 12/1980 | Germany . |
| 40 06 733 | 9/1991 | Germany . |
| 92 06 963 | 10/1992 | Germany . |

OTHER PUBLICATIONS

International Search Report for Application PCT/EP93/02544 filed 20 Sep. 1993.

English Translation for the International Preliminary Examination Report for Appln PCT/EP93/02544.

*Primary Examiner*—Charles A. Marmor
*Assistant Examiner*—David M. Fenstermacher
*Attorney, Agent, or Firm*—J. Gordon Lewis; Thomas N. Twomey

[57] ABSTRACT

A transmission gear for use with systems for cleaning windscreens, window-panes or optical instruments, comprising a wiper arm supported by a carriage performing reciprocating movements, and a gear for transforming rotary movements into oscillating movements, which cooperates with a driving means and actuates the carriage, with the gear, on the driven side, being connected to a shaft performing oscillating movements.

12 Claims, 3 Drawing Sheets

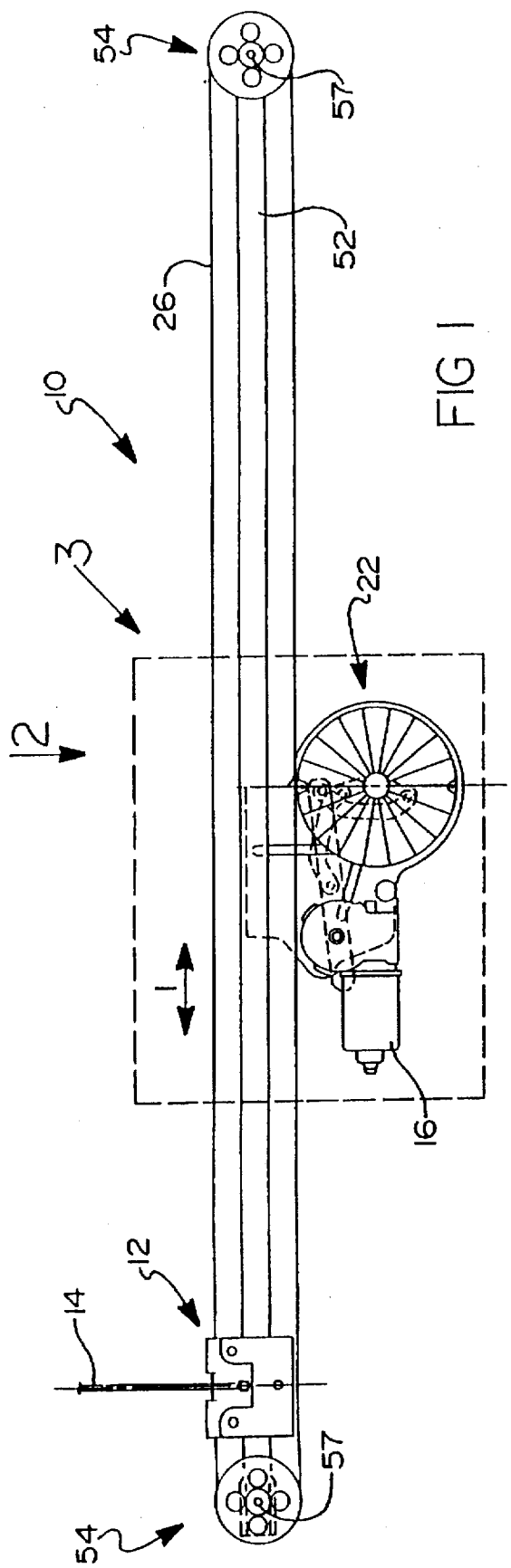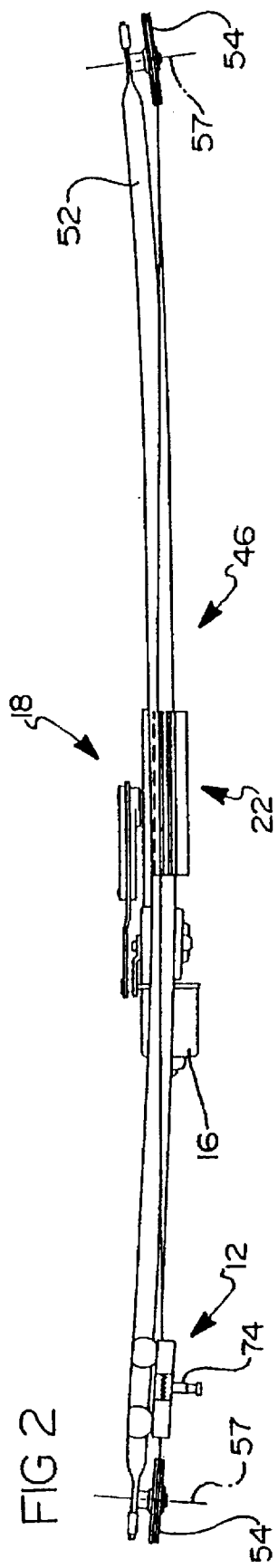

5,724,855

TRANSMISSION GEAR FOR LINEAR WIPER SYSTEMS

TECHNICAL FIELD

The present invention relates to transmission gear for use with systems for cleaning windscreens, window-panes or optical instruments and more particularly relates to the transmission gears used in manipulating wiper devices used in such systems.

BACKGROUND OF THE INVENTION

The problem involved with transmission gears of the afore-mentioned type as described, for example, by DE-PS 29 19 240 resides in that the required transmission ratio is achievable only with high technical efforts requiring the provision of parts exposed to wear as the gear is subjected to substantial forces.

Based on the afore-going state of art it is the object of the invention to so improve the transmission gear of the afore-described type with the aid of simple means that the desired transmission ratio is readily attained.

The principle underlying the invention resides in that known per se and proven toothed gears are provided between the driving part and the driven part of the transmission gear, with the driven part formed as the housing being readily connectable to the tensile and/or thrust member. By correspondingly selecting the outer diameter of the housing and the toothed gears, the desired transmission ratio of the gear can be selected accordingly.

According to a particularly advantageous embodiment, the part is in the form of a casing accommodating the toothed gears, it being particularly advantageous for the part to be of a pot-type design. The pot-shaped part, hence, fulfills two functions: on the one hand, it accommodates all parts of the transmission gear, protecting it against damage and, on the other hand, it forms, at the same time, the part which, directly or indirectly, exerts forces on the carriage.

According to another advantageous embodiment three toothed gears are provided that are in engagement with the outer gear of the hub and the gear of the shaft. In this respect, it is feasible for the axes of the toothed gears to be in a spaced relationship from and about the shaft axis, thereby insuring a uniform load and distribution of forces within the housing. Moreover, according to a particularly advantageous embodiment, the cylinder pins are rigidly connected to a mounting frame of the system. The mounting frame forms a supporting part to which all essential parts of the system, including the transmission gear, are detachably connected.

Finally, according to a particularly advantageous embodiment, the radial outer side of the housing is provided with thread-type grooves in communication with the tensile element formed as a cable or belt. In order to be able to properly clamp the cable exposed to substantial forces provision is made according to another advantageous measure of the invention that the housing formed as a cast or injection-moulded element includes a clamping means for the cable.

BRIEF DESCRIPTION OF THE DRAWINGS

FIG. 1 shows a linear wiper system with a transmission gear;

FIG. 2 shows the linear wiper system of FIG. 1 in the direction of flash II of FIG. 1;

DETAILED DESCRIPTION OF THE PREFERRED EMBODIMENT

Figure 3:
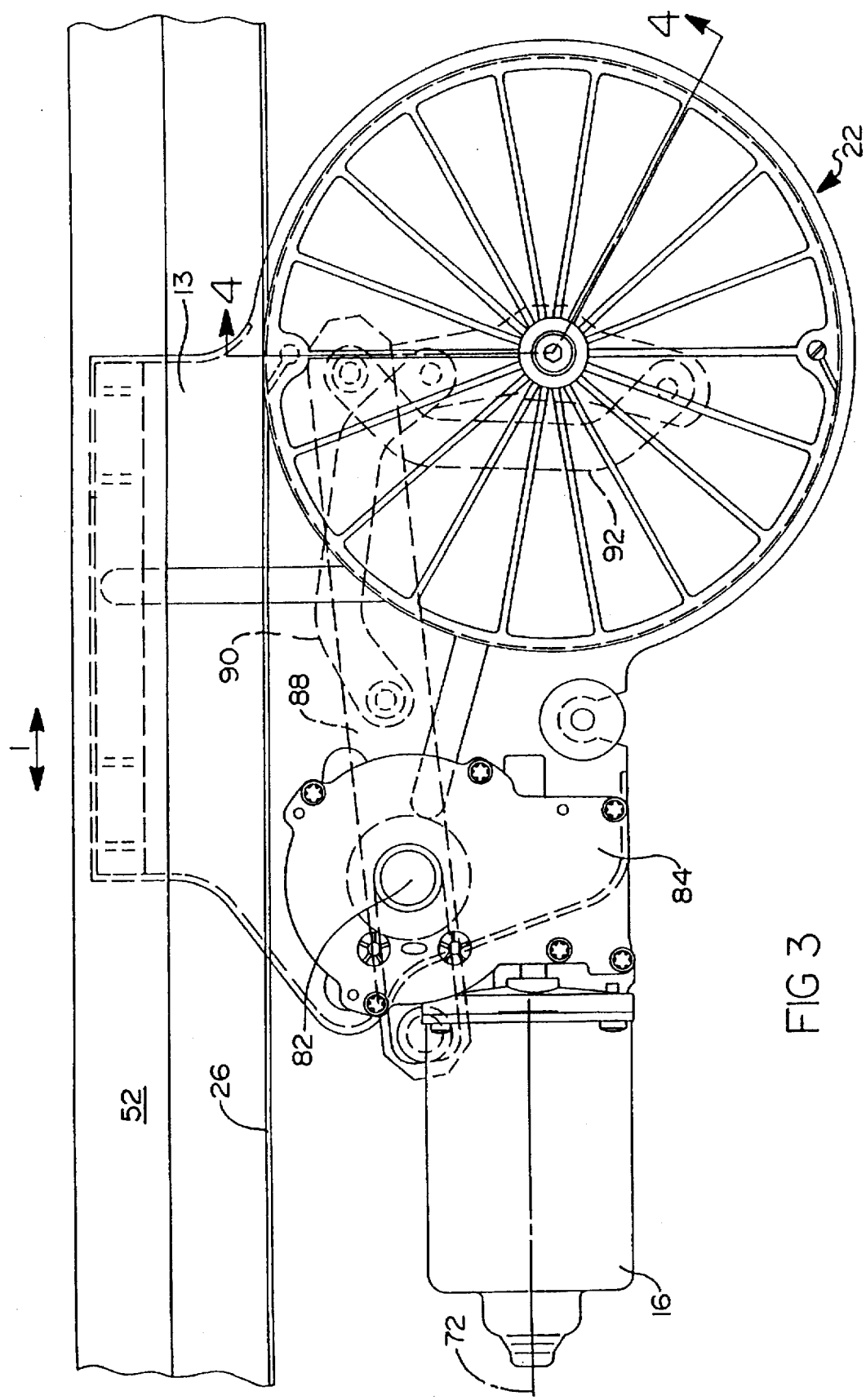
FIG. 3 shows the part designated by III in FIG. 1 on an enlarged scale.
Figure 4:
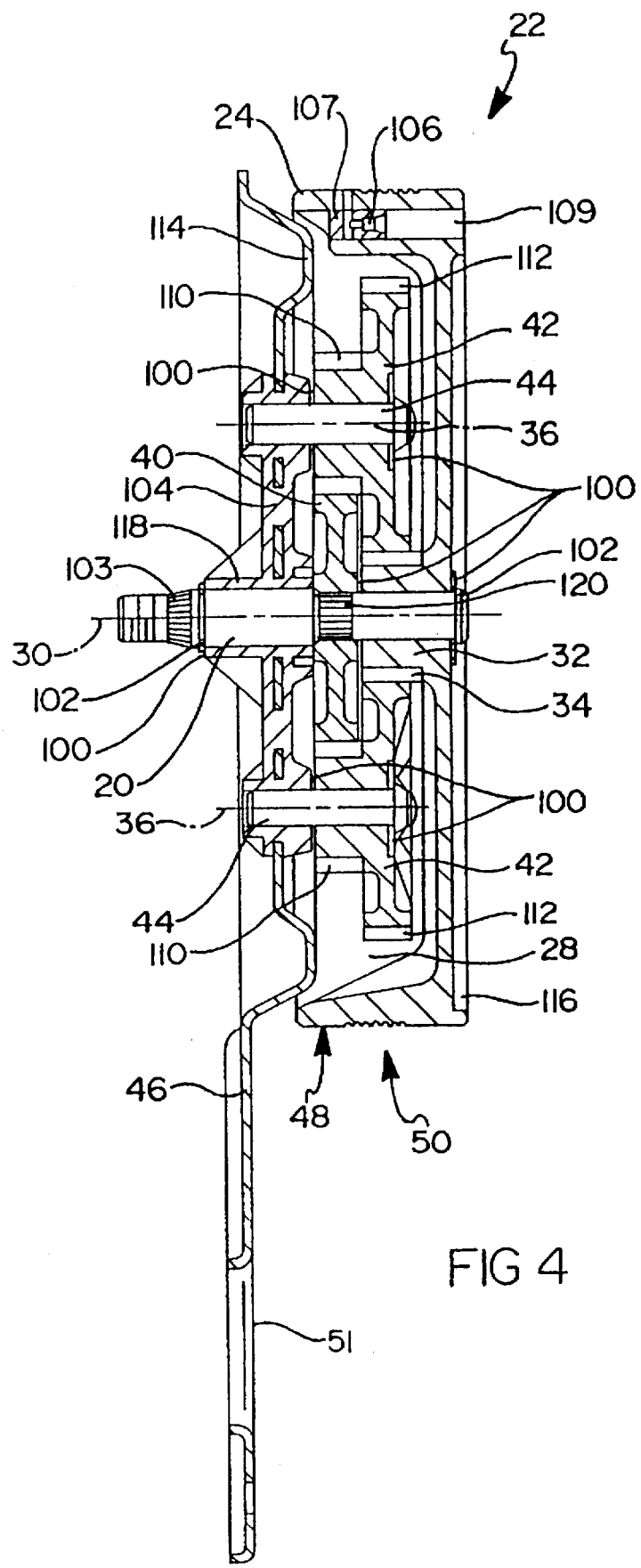
FIG. 4 is a sectional view along the line IV—IV of FIG. 3.

FIGS. 1 and 2 in connection with FIGS. 3 and 4 show a means 10 and parts thereof, respectively, for cleaning windscreens, window-panes, or optical instruments. The means 10 operating as a linear wiper system comprises a wiper arm 14 supported by a carriage 12 performing reciprocating movements, as well as a gear 18 cooperating with a driving system 16 and actuating the carriage 12. Gear 18 is intended to transform rotary movements into oscillating movements and is connected to, on the driven side, shaft 20 performing oscillating movements.

The shaft 20 is the driving part of a transmission gear 22 for oscillating movements. Part 24 of the gear 22 performing movements on the driven side actuates the carriage 12 through a tensile and/or thrust element 26.

As especially conveyed by FIG. 4, the part 24 performing movements on the driven side is a section of a hollow cylinder disposed on the shaft 20 and formed as a housing. The housing 24 comprises a hub 32 having an outer gear 34 and being located in the interior 28 of the transmission gear 22 and extending in coaxial relationship with the axis 30 of the shaft 20. On its outer side, hub 32 is provided with a depression 116. Moreover, disposed within the housing 24 are three toothed gears 42, each of them being rotatable about a respective stationary axis 36. Gears 42 are in engagement with the outer toothed gear 34 of the hub 32 and a toothed gear 40 connected in non-rotating manner to the shaft 20 through a corrugated part 120. The toothed gears 42 are carried by stationary cylinder pins 44 and comprise a large pinion 112 and a small pinion 110 each, defining the transmission ratio of the transmission gear. The adjustability of the transmission gear 22 relative to the carriage 12 will, of course also be determined by the outer diameter of the housing 24 of circular cross-section. Moreover, FIGS. 1 and 4 convey that a mounting frame 46 carries the cylinder pins 44, the shaft 20, the driving means 16, the gear 18 and the transmission gear 22 as well as a guiding rod 52 for the carriage 12 extending in the direction of movement (double arrow 1) of the carriage 12, as well as a means 51 for accommodating the reduction gear. The axial ends of the guiding rod 52 include respectively one pulley 54 for the tensile member 26 formed as a cable.

FIG. 4 conveys that the radial outer side 48 of the housing 24 is provided with thread-type grooves 50 cooperating with the cable 26.

Individually, the mounting frame 46 is a punched or cast part having a guiding rod 52 extending in the direction of movement 1 of the carriage 12. Arranged within the central area of the mounting frame 46 and below the guiding rod 52 are the driving means 16 with a reduction gear 84 in the form of an electromotor, and the gear 18 along with the transmission gear 22.

The latter-mentioned parts of the arrangement are carried by an apron 13 extending in the downward direction. The latter-mentioned parts of the system are connected, as by nuts, rivets or the like to the apron. The rotor of the motor 16 not shown in any closer detail rotates about an axis 72 extending approximately in parallel to the direction of movement 1 of the carriage yet in a direction vertical to the axis 30 of the shaft 20. Because the speed of the motor 16, as a rule, is excessively high, the reduction gear 84 is provided between the motor 16 and the gear 18. The gear 18 is driven by a crank rod of the reduction gear 84 rotating about the axis 82. The gear 18 comprises the rods 88,90 and 92 transforming the rotary movements of the crank rod into swivable movements of the shaft 20.

Providing the transmission gear 22 between the gear 18 and the cable 26 results in that the swivable movements of the shaft 20 are transformed into oscillating movements of the housing 24. Depending on the design of the toothed gears 40 and 42 and on the transmission ratio prevailing between these toothed gears and the toothed gear 40 and the outer toothed gear 34, the housing 24 repeatedly performs rotary movements in one or in another direction. It goes without saying that the toothed gears 40,42 and 34 can be so changed that the transmission ratio is varied. The toothed gears 40,42 and the housing 24 can be made of injection-moulded plastic parts or metal. The mounting frame 46, in the area of the transmission gear 22, is provided with a recess in which can be introduced the support member 104 including the holding tube 118 of the transmission gear 22, tightly filling up the recess. The cylinder pins 44 are rigidly connected to the support member 104 while the shaft 20 is rotatably connected therewith. To avoid axial misadjustments of the shaft 20, disks 100 and locking rings 102 are detachably connected to the shaft 20. A non-rotating connection between the shaft 20 and the gear 18 is insured in that the end thereof facing the gear 18 includes a corrugated part 103. The rigidity of the support member 104 in the area of the transmission gear 22 is insured because the mounting frame 46 in that area is of a non-planar configuration as shown by the annular depression 114 protruding into the interior 28.

Once the motor 16 is turned on, the rotating movements of the rotor thereof are transmitted through the reduction gear 84 to the gear 18 exerting swivelling movements on the shaft 20. The said swivelling movements of the shaft 20, through the toothed gears 40,44 and 34 are transmitted to the housing 24 performing several revolutions in clockwise direction and, thereafter, the same number of revolutions in counter clockwise direction. As the cable 26 is connected to the housing 24 in a non-skid way and by means of a clamp screw 106 is held within a bore 109 with thread and pressure member 107, it is reciprocated 1 (see FIG. 1) so that also the carriage 12 with the wiper arm 14 is driven. The speed of the carriage 12 in the range of adjustment is not constant. The maximum speed is reached by the carriage approximately in the central area between the two pulleys 54 rotatable about the axes 57, while it gradually decreases in the end areas (see FIGS. 1 and 2) until the value zero is reached. Thereafter the carriage 12 moves in the opposite direction to increase in speed. After reaching the maximum speed, i.e. once the carriage 12 is contained approximately in the area of the transmission gear 22, its speed decreases again until the turning point is reached where the speed corresponds to zero. These reciprocating movements are repeated as long as the electromotor 16 is actuated.

The wiper arm 14 is arranged in a direction approximately vertical to the guiding rod 52 and is supported by the bolt 74. The provision of idlers which with the bolts thereof are connected through safety disks insures a proper sequence of motions of the carriage 12. As the cable 26 during movement of the carriage 12 is exposed to substantial forces it will, in case of need, have to be stressed for which purpose a clamping device comprising a nut is provided which is supported on disks.

What is claimed is:

1. A windscreen cleaning means, comprising:
   a wiper arm supported by a carriage, said carriage being in turn supported by a tensile member performing reciprocating movements,
   a driving means,
   a gear cooperating with said driving means and being connected to a shaft in a non-rotating manner, said gear transforming rotary movements of said driving means into oscillating movements of said shaft, and
   a transmission gear actuating the carriage and connected to the shaft, with the shaft being an actuating part of the transmission gear, said transmission gear transforming the oscillating movements of said shaft into the reciprocating movements of said tensile member, said transmission gear comprising
      a hollow cylindrical pot-shaped part rotatably arranged on the shaft and assuming a function of a housing for said transmission gear, and
      a hub with an external toothed gear extending in a coaxial relationship with an axis of the shaft, and axially extending into a cavity of the housing, the external toothed gear being in engagement with at least one intermediate toothed gear having two rows of teeth which, in turn, is driven by a shaft toothed gear connected in a non-rotating manner to the shaft, wherein
      the at least one intermediate toothed gear is provided within the cavity of the housing.

2. The windscreen cleaning means according to claim 1, wherein the hub with the external toothed gear is integrally formed with the part.

3. The windscreen cleaning means according to claim 1, wherein the three intermediate toothed gears are in engagement with the external toothed gear of the hub and the shaft toothed gear.

4. The windscreen cleaning means according to claim 1, wherein the intermediate toothed gears are carried by cylindrical pins.

5. The windscreen cleaning means according to claim 4, wherein the cylindrical pins are rigidly connected to.

6. The windscreen cleaning means according to claim 5, wherein the part is open toward the mounting frame.

7. The windscreen cleaning means according to claim 1, wherein a radial outer side of the housing comprises thread-type grooves in cooperation with the tensile member formed as a cable.

8. The windscreen cleaning means according to claim 1, wherein the housing is formed from at least one of a cast and injection-molded element and is provided with a clamping means for the cable.

9. The windscreen cleaning means according to claim 1, further comprising a mounting frame, with the transmission gear detachable connected thereto.

10. The windscreen cleaning means according to claim 1, wherein there provided three intermediate toothed gears.

11. The windscreen cleaning means according to claim 10, wherein the axes of the intermediate toothed gears are provided at a distance from and uniformly about the axis of the shaft.

12. A windscreen cleaning means, comprising:
    a wiper arm supported by a carriage, said carriage being in turn supported by a tensile member performing reciprocating movements,
    a driving means,
    a gear cooperating with said driving means and being connected to a shaft in a non-rotating manner, said gear transforming rotary movements of said driving means into oscillating movements of said shaft, and
    a transmission gear connected to said shaft, said transmission gear transforming said oscillating movements of said shaft into said reciprocating movements of said tensile member, said transmission gear containing:

a cylindrical pot-shaped housing rotatably arranged on said shaft, and a hub with an external toothed gear extending in a coaxial relationship with an axis of said shaft and axially extending into a cavity of said housing, said external toothed gear being in engagement with at least one intermediate toothed gear having two rows of teeth which, in turn, is driven by a shaft toothed gear connected in a non-rotating manner to said shaft, said hub being connected in a non-rotating manner to said housing, a radial outer side of said housing being provided with thread-type grooves cooperating with said tensile member.

* * * * *

UNITED STATES PATENT AND TRADEMARK OFFICE
CERTIFICATE OF CORRECTION

PATENT NO. : 5,724,855
DATED : March 10, 1998
INVENTOR(S) : Mayer; Scholl

It is certified that error appears in the above-indentified patent and that said Letters Patent is hereby corrected as shown below:

Column 4, Claim 5, after the word "to", insert --a mounting frame of the means-- therefor.

Signed and Sealed this

Sixteenth Day of June, 1998

Attest:

BRUCE LEHMAN

Attesting Officer     Commissioner of Patents and Trademarks